(12) United States Patent
Ishihara et al.

(10) Patent No.: US 10,308,755 B2
(45) Date of Patent: Jun. 4, 2019

(54) SHEET-FORMING BODY, ADHESIVE SHEET, AND LAMINATE

(71) Applicant: BRIDGESTONE CORPORATION, Tokyo (JP)

(72) Inventors: Takenobu Ishihara, Chuo-ku (JP); Shuyou Akama, Chuo-ku (JP); Atsushi Hara, Chuo-ku (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 191 days.

(21) Appl. No.: 15/303,802

(22) PCT Filed: Mar. 31, 2015

(86) PCT No.: PCT/JP2015/060276
§ 371 (c)(1),
(2) Date: Oct. 13, 2016

(87) PCT Pub. No.: WO2015/159708
PCT Pub. Date: Oct. 22, 2015

(65) Prior Publication Data
US 2017/0037179 A1    Feb. 9, 2017

(30) Foreign Application Priority Data

Apr. 18, 2014 (JP) ................ 2014-086377

(51) Int. Cl.

| | |
|---|---|
| *B32B 15/095* | (2006.01) |
| *B32B 25/08* | (2006.01) |
| *B32B 25/12* | (2006.01) |
| *B32B 25/14* | (2006.01) |
| *B32B 27/28* | (2006.01) |
| *B32B 7/12* | (2006.01) |
| *B32B 23/08* | (2006.01) |
| *B32B 27/00* | (2006.01) |
| *B32B 27/40* | (2006.01) |
| *C08G 18/38* | (2006.01) |
| *C08G 18/09* | (2006.01) |
| *C09J 7/00* | (2018.01) |
| *C09J 11/06* | (2006.01) |
| *C09J 175/00* | (2006.01) |
| *C09J 175/04* | (2006.01) |
| *C09J 181/00* | (2006.01) |
| *C08J 5/18* | (2006.01) |
| *B32B 15/18* | (2006.01) |
| *C08G 18/18* | (2006.01) |
| *C08G 18/73* | (2006.01) |

(Continued)

(52) U.S. Cl.
CPC .......... *C08G 18/3876* (2013.01); *B32B 7/12* (2013.01); *B32B 15/095* (2013.01); *B32B 15/18* (2013.01); *B32B 25/08* (2013.01); *B32B 25/12* (2013.01); *B32B 25/14* (2013.01); *B32B 27/28* (2013.01); *C08G 18/092* (2013.01); *C08G 18/1808* (2013.01); *C08G 18/3855* (2013.01); *C08G 18/6453* (2013.01); *C08G 18/73* (2013.01); *C08G 18/7831* (2013.01); *C08G 18/792* (2013.01); *C08G 75/00* (2013.01); *C09J 7/00* (2013.01); *C09J 175/04* (2013.01); *C09J 181/00* (2013.01); *B32B 2250/03* (2013.01); *B32B 2250/24* (2013.01); *B32B 2270/00* (2013.01); *C09J 175/06* (2013.01); *C09J 2475/00* (2013.01)

(58) Field of Classification Search
CPC ............ C08G 18/3855; C08G 18/3876; C08G 18/6453; C08G 75/00; B32B 7/12; B32B 15/095; B32B 25/08; B32B 25/12; B32B 25/14; B32B 27/28; C09J 7/00; C09J 181/00; C09J 175/04; C08L 81/00; C08L 75/04; C09D 181/00; C09D 175/04
See application file for complete search history.

(56) References Cited

U.S. PATENT DOCUMENTS

| | | | | |
|---|---|---|---|---|
| 5,908,876 A | * | 6/1999 | Fujii ................... | C08F 283/006 359/642 |
| 9,732,259 B2 | * | 8/2017 | Ishihara .................| C09J 175/04 |

(Continued)

FOREIGN PATENT DOCUMENTS

| | | |
|---|---|---|
| CN | 102666676 A | 9/2012 |
| JP | 57-80428 A | 5/1982 |

(Continued)

OTHER PUBLICATIONS

International Search Report for PCT/JP2015/060276 dated Jun. 30, 2015 [PCT/ISA/210].

(Continued)

*Primary Examiner* — Kregg T Brooks
(74) *Attorney, Agent, or Firm* — Sughrue Mion, PLLC

(57) ABSTRACT

The present invention provides a sheet-forming body containing a thiourethane bond-having compound and a thiol group-having compound, wherein, in an IR absorption spectrum thereof, the ratio of the peak intensity A of the absorption peak based on the carbonyl group in the thiourethane bond to the peak intensity B of the absorption peak based on the thiol group (A/B) is 20 or more and 250 or less. Using the sheet-forming body, rubber members, especially vulcanized rubber members can be strongly bonded, and the sheet-forming body and an adhesive sheet, which are excellent in handleability and workability, and a laminate produced by bonding rubber layers using the sheet-forming body are provided.

8 Claims, No Drawings

(51) Int. Cl.
*C08G 18/64* (2006.01)
*C08G 75/00* (2006.01)
*C08G 18/78* (2006.01)
*C08G 18/79* (2006.01)
*C09J 175/06* (2006.01)

(56) References Cited

U.S. PATENT DOCUMENTS

| | | | | |
|---|---|---|---|---|
| 9,975,986 | B2* | 5/2018 | Ishihara | B32B 25/08 |
| 2010/0075154 | A1 | 3/2010 | Hayashi et al. | |
| 2010/0236707 | A1 | 9/2010 | Studer et al. | |
| 2012/0225274 | A1 | 9/2012 | Ishikawa et al. | |
| 2015/0353791 | A1* | 12/2015 | Ishihara | C09J 175/04 528/50 |
| 2016/0122460 | A1* | 5/2016 | Fedurco | C08G 18/677 428/626 |
| 2016/0168309 | A1* | 6/2016 | Ishihara | B32B 25/08 428/423.9 |
| 2016/0264743 | A1 | 9/2016 | Ishikawa et al. | |

FOREIGN PATENT DOCUMENTS

| | | |
|---|---|---|
| JP | 9-12663 A | 1/1997 |
| JP | 10-139901 A | 5/1998 |
| JP | 10-298260 A | 11/1998 |
| JP | 2010-83773 A | 4/2010 |
| JP | 2010-155897 A | 7/2010 |
| JP | 2014-227499 A | 12/2014 |
| WO | 2010/032365 A1 | 3/2010 |
| WO | 2014/109217 A1 | 7/2014 |
| WO | 2014/188914 A1 | 11/2014 |

OTHER PUBLICATIONS

Communication dated Mar. 27, 2017 issued by the European Patent Office in counterpart application No. 15780293.5.

* cited by examiner

SHEET-FORMING BODY, ADHESIVE SHEET, AND LAMINATE

CROSS REFERENCE TO RELATED APPLICATIONS

This application is a National Stage of International Application No. PCT/JP2015/060276, filed on Mar. 31, 2015, which claims priority from Japanese Patent Application No. 2014-086377, filed on Apr. 18, 2014, the contents of all of which are incorporated herein by reference in their entirety.

TECHNICAL FIELD

The present invention relates to a sheet-forming body, an adhesive sheet and a laminate, and precisely relates to a sheet-forming body and an adhesive sheet suitable for bonding of rubber members and to a laminate produced by bonding rubber layers using the sheet-forming body.

BACKGROUND ART

Heretofore, a material having a good adhesion force to a vulcanized rubber member is desired, but there is not known any material capable of realizing a sufficient adhesion force. As a method of bonding a vulcanized rubber member, for example, PTL 1 discloses a technique of surface-treating a vulcanized rubber member and bonding another member to the treated surface via an adhesive therebetween.

CITATION LIST

Patent Literature

PTL 1: JP-A 10-139901

SUMMARY OF INVENTION

Technical Problem

However, in the method described in PTL 1, vulcanized rubber is subjected to surface treatment, and then bonded to another material via an adhesive, that is, the method requires time for the surface treatment. Furthermore, the method uses a polyurethane adhesive, and the adhesion force thereof is insufficient.

Objects of the present invention are to provide a sheet-forming body and an adhesive sheet capable of strongly bonding rubber members, especially vulcanized rubber members and excellent in handleability and workability, and to provide a laminate produced by bonding rubber layers using the sheet-forming body.

Solution to Problem

The present inventors have found that, in an IR absorption spectrum of a sheet-forming body containing a thiourethane bond-having compound and a thiol group-having compound, when the ratio of the peak intensity of the absorption peak based on the carbonyl group in the thiourethane bond to the peak intensity of the absorption peak based on the thiol group is controlled to fall within a specific range, the problems of the present invention can be solved, and have completed the present invention.

Specifically, the present invention relates to the following [1] to [9].

[1] A sheet-forming body containing a thiourethane bond-having compound and a thiol group-having compound, wherein:
in an IR absorption spectrum thereof, the ratio of the peak intensity A of the absorption peak based on the carbonyl group in the thiourethane bond to the peak intensity B of the absorption peak based on the thiol group (A/B) is 20 or more and 250 or less.

[2] The sheet-forming body described in [1], wherein at least a polythiol compound (A) and an isocyanate group-containing compound (B) are blended.

[3] The sheet-forming body described in [2], wherein a radical generator (C) is further blended.

[4] The sheet-forming body described in [3], wherein the radical generator (C) is a thermal radical generator containing a peroxide.

[5] The sheet-forming body described in [3] or [4], wherein the content of the peroxide, as measured through liquid chromatography mass spectrometry, is 2% by mass or more.

[6] The sheet-forming body described in any of [2] to [5], wherein the ratio of the total molar number of the isocyanate group contained in the isocyanate group-containing compound (B) to the total molar number of the thiol group contained in the polythiol compound (A) (isocyanate group/thiol group) is 0.2 or more and 0.78 or less.

[7] The sheet-forming body described in any of [4] to [6], wherein the ratio of the total molar number of the radical generator (C) to the total molar number of the thiol group contained in the polythiol compound (A) (radical generator (C)/thiol group) is 0.025 or more.

[8] An adhesive sheet provided with the sheet-forming body described in any of [1] to [7].

[9] A laminate including two or more layers bonded to each other, wherein:
at least one layer is a rubber layer, and
the at least one rubber layer is adhered to the adjacent layer via the sheet-forming body described in any of [1] to [7].

Advantageous Effects of Invention

According to the present invention, there can be provided a sheet-forming body and an adhesive sheet capable of strongly bonding rubber members, especially vulcanized rubber members and excellent in handleability and workability, and a laminate produced by bonding rubber layers using the sheet-forming body.

DESCRIPTION OF EMBODIMENTS

[Sheet-Forming Body]

The sheet-forming body of the present invention contains a thiourethane bond-having compound and a thiol group-having compound, and in an IR absorption spectrum thereof, the ratio of the peak intensity A of the absorption peak based on the carbonyl group in the thiourethane bond to the peak intensity B of the absorption peak based on the thiol group (A/B) is 20 or more and 250 or less.

The thiourethane bond-having compound in the present invention is basically one to be obtained through reaction of a thiol group-having compound such as a polythiol compound to be mentioned below and an isocyanate group-containing compound. With that, the sheet-forming body of the present invention is arranged between two layers of which at least one layer is a rubber layer, and is used for bonding the rubber layer, and therefore, since the sheet-forming body must adhere to the double bond in a rubber surface through so-called thiol-ene reaction, it is important that, even in the state where the reaction between the thiol group-having compound and the isocyanate group-containing compound has almost completed, thiol groups (that is, unreacted thiol group-having compound) still remain excessively in the sheet-forming body.

From the above-mentioned viewpoint, in the present invention, it is necessary that, in the IR absorption spectrum of the sheet-forming body, the ratio of the peak intensity A of the absorption peak based on the carbonyl group in the thiourethane bond to the peak intensity B of the absorption peak based on the thiol group (A/B) is 20 or more and 250 or less.

When the above ratio is less than 20, the cohesion force of the sheet-forming body as a film is not sufficient and, as a result, the adhesiveness in adhesion to a rubber layer may lower. On the other hand, when the ratio is more than 250, the amount of the thiol group in the sheet-forming body runs short and also in the case, the number of the reaction points of the thiol-ene reaction on adhesion to a rubber layer is insufficient so that the adhesiveness may lower.

The ratio of the peak intensity A of the absorption peak based on the carbonyl group to the peak intensity B of the absorption peak based on the thiol group (A/B) is preferably 30 or more and 200 or less, more preferably 40 or more and 170 or less.

The sheet-forming body of the present invention is, from the viewpoint of handleability and workability thereof, preferably a film having some flexibility and having strength enough to endure the bonding operation in production of laminates to be mentioned below. From the viewpoint, it is desirable that the ratio A/B in the sheet-forming body falls within the above-mentioned range.

Specifically, the peak intensity in the IR absorption spectrum in the present invention is measured on a sheet-like sample using an FTIR device, and the details of the measurement conditions are described below.

<Thiourethane Bond-Having Compound>

As described above, the thiourethane bond-having compound in the present invention is basically one to be obtained through reaction of a thiol group-having compound and an isocyanate group-containing compound. The thiol group-having compound is not specifically limited, but from the viewpoint of increasing the cohesion force of the sheet-forming body as a film, the compound is preferably a polythiol compound having two or more thiol groups in one molecule. Specifically, the sheet-forming body of the present invention is preferably one to be produced by blending a polythiol compound (A) and an isocyanate group-containing compound (B).

In this description, the polythiol compound (A), the isocyanate group-containing compound (B), and further a radical generator (C), an urethanation catalyst (D) and a surface conditioner (E) to be mentioned below may be referred to as a component (A), a component (B), a component (C), a component (D) and a component (E), respectively.

<Polythiol Compound (A)>

As described above, in the present invention, the polythiol compound (A) is a compound having two or more thiol groups in one molecule. Not specifically limited, the polythiol compound (A) preferably has from 2 to 6 thiol groups in one molecule, from the viewpoint of improving the adhesiveness.

The polythiol compound (A) includes a compound in which the thiol group binds to a primary carbon atom, a compound in which the thiol group binds to a secondary carbon atom, a compound in which the thiol group binds to a tertiary carbon atom, a compound in which the group binds to any other element, etc., but in the present invention, using a compound in which the thiol group binds to a primary carbon atom as the polythiol compound (A) is preferred since the curing time of the composition to be obtained through urethanation reaction thereof with the isocyanate group-containing compound (B) to be mentioned below can be shortened.

The molecular weight of the polythiol compound (A) is preferably at most 3,000 from the viewpoint of improving the adhesiveness, more preferably at most 2,000, even more preferably at most 1,000, still more preferably at most 900, further more preferably at most 800. In the case where the polythiol compound (A) is a polymer, the molecular weight is a styrene-equivalent number-average molecular weight thereof in gel permeation chromatography (GPC).

The polythiol compound (A) includes an aliphatic polythiol having a thiol group binding to a primary carbon atom and optionally containing a hetero atom (hereinafter this may be referred to as "aliphatic polythiol optionally containing a hetero atom") and an aromatic polythiol having a thiol group binding to a primary carbon atom and optionally containing a hetero atom (hereinafter this may be referred to as "aromatic polythiol optionally containing a hetero atom"), and from the viewpoint of improving the adhesiveness, preferred here is the aliphatic polythiol optionally containing a hetero atom.

Here, the aliphatic polythiol optionally containing a hetero atom means an aliphatic compound having two or more thiol groups each binding to a primary carbon atom in one molecule and optionally containing a hetero atom therein. The aromatic polythiol optionally containing a hetero atom means an aromatic compound having two or more thiol groups each binding to a primary carbon atom in one molecule and optionally containing a hetero atom therein.

The hetero atom is preferably at least one selected from oxygen, nitrogen, sulfur, phosphorus, halogen atom, and silicon, from the viewpoint of improving the adhesiveness. More preferred is at least one selected from oxygen, nitrogen, sulfur, phosphorus and halogen atom; and even more preferred is at least one selected from oxygen, nitrogen and sulfur.

The aliphatic polythiol optionally containing a hetero atom includes, for example, acyclic aliphatic compounds optionally containing a hetero atom, such as polythiols where the other moiety than the thiol group is an aliphatic hydrocarbon, such as alkanedithiols having from 2 to 20 carbon atoms, etc., polythiols derived from alcohol-halohydrin adducts by substituting the halogen atom therein with a thiol group, polythiols of hydrogen sulfide reaction products of polyepoxide compounds, thioglycolates obtained through esterification of a polyalcohol having from 2 to 6 hydroxyl groups in one molecule with a thioglycolic acid, mercapto-fatty acid esters obtained through esterification of a polyalcohol having from 2 to 6 hydroxyl groups in one molecule with a mercapto-fatty acid, etc.; compounds having an isocyanurate ring structure, such as thiol isocyanurate compounds obtained through reaction of an isocyanurate compound and a thiol, etc.; polysulfide group-containing thiols; thiol group-modified silicones, thiol group-modified silsesquioxanes, etc. Of those, preferred for use herein are acyclic aliphatic compounds optionally containing a hetero atom and isocyanurate ring structure-having compounds, from the viewpoint of the shortened curing time and the adhesion force of the composition containing the compound.

The polyalcohol having from 2 to 6 hydroxyl group in the molecule includes alkanediols having from 2 to 20 carbon atoms, poly(oxyalkylene) glycols, glycerol, diglycerol, trimethylolpropane, ditrimethylolpropane, pentaerythritol, dipentaerythritol, etc.

(Acyclic Aliphatic Compounds Optionally Containing Hetero Atom)

As the acyclic aliphatic compound optionally containing a hetero atom, from the viewpoint of improving the adhesiveness, preferred are polythiols where the other moiety than the thiol group is an aliphatic hydrocarbon, polythiols derived from alcohol-halohydrin adducts by substituting the halogen atom therein with a thiol group, polythiols of hydrogen sulfide reaction products of polyepoxide compounds, thioglycolates, mercapto-fatty acid esters and thiol isocyanurate compounds. More preferred are mercapto-fatty acid esters and thiol isocyanurate compounds, and even more preferred are mercapto-fatty acid esters. From the same viewpoint, more preferred are thiols not containing a polysulfide group and a siloxane bond.

The acyclic aliphatic compound optionally containing a hetero atom for use in the present invention is preferably a (tetra to hexafunctional) compound having 4 to 6 of the above-mentioned thiol groups in the molecule, and from the viewpoint of shortening the curing time and improving the adhesiveness thereof, more preferred is at least one selected from (tetrafunctional) compounds having four of the above-mentioned thiol groups in the molecule and (hexafunctional) compounds having six of the above-mentioned thiol groups in the molecule.

(Polythiols where the Other Moiety than Thiol Group is Aliphatic Hydrocarbon)

Examples of polythiols where the other moiety than the thiol group is an aliphatic hydrocarbon include alkanedithiols having from 2 to 20 carbon atoms.

The alkanedithiols having from 2 to 20 carbon atoms include 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,8-octanedithiol, 1,10-decanedithiol, 1,1-cyclohexanedithiol, 1,2-cyclohexanedithiol, etc.

(Thioglycolates)

The thioglycolates include 1,4-butanediol bisthioglycolate, 1,6-hexanediol bisthioglycolate, trimethylolpropane tristhioglycolate, pentaerythritol tetrakisthioglycolate, etc. Among these, pentaerythritol tetrakisthioglycolate is preferred.

—Mercapto-Fatty Acid Esters—

The mercapto-fatty acid esters are preferably mercapto-fatty acid esters having a thiol group binding to a primary carbon atom, from the viewpoint of improving the adhesiveness; and more preferred are β-mercaptopropionates of polyalcohols having from 2 to 6 hydroxyl groups in the molecule. The mercapto-fatty acid esters having a thiol group binding to a primary carbon atom are preferably those in which the number of the thiol groups in one molecule is from 4 to 6 (tetra to hexafunctional), more preferably 4 or 6, even more preferably 4, from the viewpoint of improving the adhesiveness.

The β-mercaptopropionates having a thiol group binding to a primary carbon atom are preferably tetraethylene glycol bis(3-mercaptopropionate) (EGMP-4), trimethylolpropane tris(3-mercaptopropionate) (TMMP), pentaerythritol tetrakis(3-mercaptopropionate) (PEMP), and dipentaerythritol hexakis(3-mercaptopropionate) (DPMP). Of those, preferred are PEMP and DPMP, and more preferred is PEMP.

The β-mercaptopropionates having a thiol group binding to a secondary carbon atom include esters of β-mercaptobutanoic acid with a polyalcohol having 2 to 6 hydroxyl groups in the molecule, concretely including 1,4-bis(3-mercpatobutyryloxy)butane, pentaerythritol tetrakis(3-mercaptobutyrate), etc.

(Compounds Having Isocyanurate Ring Structure)

The compounds having an isocyanurate ring structures are, from the viewpoint of improving the adhesion force, preferably thiol isocyanurate compounds having a thiol group binding to a primary carbon atom. As the thiol isocyanurate compounds having a thiol group binding to a primary carbon atom, preferred are compounds having from 2 to 4 thiol groups in one molecule from the viewpoint of improving the adhesiveness, and more preferred are compounds having 3 thiol groups.

The thiol isocyanurate compound having a thiol group binding to a primary carbon atom is preferably tris-[(3-mercaptopropionyloxy)-ethyl]-isocyanurate (TEMPIC).

(Thiol Group-Modified Silicones)

The thiol group-modified silicones include KF-2001, KF-2004, X-22-167B (all trade names by Shin-Etsu Chemical Co., Ltd.), SMS042, SMS022 (both trade names by Gelest), PS849, PS850 (both trade names by UCT), etc.

(Aromatic Polythiols)

The aromatic polythiols include 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, etc.

<Isocyanate Group-Containing Compound (B)>

The isocyanate group-containing compound (B) includes aromatic, aliphatic and alicyclic diisocyanate compounds and their modified derivatives, etc.

The aromatic, aliphatic and alicyclic diisocyanate compounds include, for example, tolylene diisocyanate (TDI), diphenylmethane diisocyanate (MDI), xylylene diisocyanate (XDI), naphthylene diisocyanate (NDI), phenylene diisocyanate (PPDI), m-tetramethylxylylene diisocyanate (TMXDI), methylcyclohexane diisocyanate (hydrogenated TDI), dicyclohexylmethane diisocyanate (hydrogenated MDI), cyclohexane diisocyanate (hydrogenated PPDI), bis(isocyanatomethyl)cyclohexane (hydrogenated XDI), norbornene diisocyanate (NBDI), isophorone diisocyanate (IPDI), hexamethylene diisocyanate (HDI), butane diisocyanate, 2,2,4-trimethylhexamethylene diisocyanate, 2,4,4-trimethylhexamethylene diisocyanate, etc.

In the case where the polythiol compound (A) to be blended is a mercapto-fatty acid ester or a thiol isocyanurate compound, the isocyanate group-containing compound (B) to be blended is preferably one or more of hexamethylene diisocyanate (HDI), isophorone diisocyanate (IPDI), tolylene diisocyanate (TDI), xylylene diisocyanate (XDI), and diphenylmethane diisocyanate (MDI). Of those, more preferred are one or more of hexamethylene diisocyanate (HDI), isophorone diisocyanate (IPDI), xylylene diisocyanate (XDI), bis(isocyanatomethyl)cyclohexane (hydrogenated XDI) and tolylene diisocyanate (TDI).

The modified derivatives of aromatic, aliphatic or alicyclic diisocyanate compounds include TMP (trimethylolpropane) adduct-type modified derivatives to be obtained through reaction of a trimethylolpropane and an isocyanate, isocyanurate-type modified derivatives to be obtained through trimerization of an isocyanate, a burette-type modified derivatives to be obtained through reaction of a urea and an isocyanate, an allophanate-type modified derivatives to be obtained through reaction of a urethane and an isocyanate, prepolymers to be obtained through reaction with a polyol, etc., and any of these may be suitably used here.

As the TMP adduct-type modified derivatives, the isocyanurate-type modified derivatives, the burette-type modified derivatives and the allophanate-type modified derivatives, the following are preferred from the viewpoint of improving the adhesiveness.

Specifically, as the TMP adduct-type modified derivatives, preferred are TMP adduct-type modified derivatives to be obtained through reaction of TMP and TDI, TMP adduct-type modified derivatives to be obtained through reaction of TMP and XDI, TMP adduct-type modified derivatives to be obtained through reaction of TMP and hydrogenated XDI, TMP adduct-type modified derivatives to be obtained through reaction of TMP and IPDI, TMP adduct-type modified derivatives to be obtained through reaction of TMP and HDI, and TMP adduct-type modified derivatives to be obtained through reaction of TMP and MDI.

As the isocyanurate-type modified derivatives, preferred are isocyanurate-type modified derivatives to be obtained through trimerization of HDI, isocyanurate-type modified derivatives to be obtained through trimerization of IPDI, isocyanurate-type modified derivatives to be obtained through trimerization of TDI, and isocyanurate-type modified derivatives to be obtained through trimerization of hydrogenated XDI, and more preferred are at least one or more of isocyanurate-type modified derivatives to be obtained through trimerization of HDI, isocyanurate-type modified derivatives to be obtained through trimerization of IPDI, and isocyanurate-type modified derivatives to be obtained through trimerization of hydrogenated XDI.

As the burette-type modified derivatives, preferred are burette-type modified derivatives to be obtained through reaction of urea and HDI.

As the allophanate-type modified derivatives, preferred are allophanate-type modified derivatives to be obtained through reaction of urethane and IPDI.

As the polythiol compound (A) to be combined with at least one of the above-mentioned TMP adduct-type modified derivatives, isocyanurate-type modified derivatives, burette-type modified derivatives and allophanates-type modified derivatives, preferred are one or two of thioglycolates, or β-mercaptopropionates having a thiol group bonding to a primary carbon atom and thiol isocyanurate compounds having a thiol group bonding to a primary carbon atom.

Here, the thioglycolate is preferably pentaerythritol tetrakisthioglycolate. The β-mercaptopropionate having a thiol group bonding to a primary carbon atom is preferably at least one selected from pentaerythritol tetrakis(3-mercaptopropionate) (PEMP) and dipentaerythritol hexakis(3-mercaptopropionate) (DPMP). As the thiol isocyanurate compound having a thiol group bonding to a primary carbon atom, preferred is a thiol isocyanurate compound having a thiol group bonding to a primary carbon atom, in which the number of the thiol groups in one molecule is 3, and more preferred is tris-[(3-mercaptopropionyloxy)-ethyl] isocyanurate (TEMPT C).

<Radical Generator (C)>

Preferably, in the sheet-forming body of the present invention, a radical generator (C) is incorporated. As the radical generator (C), usable here is at least one of a thermal radical generator and a photoradical generator. Of those, from the viewpoint of improving the adhesion force and from the viewpoint that the composition can adhere non-transparent (lightproof) rubber, preferred is a thermal radical generator, more preferred is a thermal radical generator containing a peroxide, and even more preferred is a thermal radical generator containing an organic peroxide.

One of the radical generators (C) may be used singly or two or more thereof may be used in combination.

The thermal radical generator containing an organic peroxide includes, for example, t-butyl 2-ethylperoxyhexanoate, dilauroyl peroxide, 1,1,3,3-tetramethylbutylperoxy-2-ethylhexanoate, 1,1-di(t-hexylperoxy)cyclohexanone, di-t-butyl peroxide, t-butylcumyl peroxide, 1,1-di(t-hexylperoxy)-3,3,5-trimethylcyclohexane, t-amylperoxy-2-ethyl hexanoate, di(2-t-butylperoxyisopropyl)benzene, di(t-butyl) peroxide, benzoyl peroxide, 1,1'-di(2-t-butylperoxyisopropyl)benzene, benzoyl peroxide, 1,1'-di(t-hexylperoxy)cyclohexane, di(3,5,5-trimethylhexanoyl) peroxide, t-butylperoxy neodecanoate, t-hexylperoxy neodecanoate, dicumyl peroxide, etc. Of those, preferred is at least one of t-butyl-2-ethylperoxyhexanoate, dilauroyl peroxide, 1,1,3,3-tetramethylbutylperoxy-2-ethylhexanoate, 1,1-di(t-butylperoxy)cyclohexanone, di-t-butyl peroxide, and t-butylcumyl peroxide. One of the thermal radical generators containing an organic peroxide may be used singly or two or more thereof may be used in combination.

The thermal radical generator containing an inorganic peroxide includes a redox generator containing a combination of an oxidizing agent and a reducing agent, such as a combination of hydrogen peroxide and an iron(II) salt, a combination of a persulfate and sodium hydrogensulfite, etc. One of the thermal radical generators containing an inorganic peroxide may be used singly or two or more thereof may be used in combination.

As the photoradical generator, any known ones may be used here widely with no specific limitation thereon.

For example, there is mentioned an intramolecular-cleaving photoradical generator, which includes a benzoin alkyl ether-type photoradical generator such as benzoin ethyl ether, benzoin isobutyl ether, benzoin isopropyl ether, etc.; an acetophenone-type photoradical generator such as 2,2-diethoxyacetophenone, 4'-phenoxy-2,2-dichloroacetophenone, etc.; a propiophenone-type photoradical generator such as 2-hydroxy-2-methylpropiophenone, 4'-isopropyl-2-hydroxy-2-methylpropiophenone, 4'-dodecyl-2-hydroxy-2-methylpropiophenone, etc.; benzyl dimethyl ketal, 1-hydroxycyclohexyl phenyl ketone; an anthraquinone-type photoradical generator such as 2-ethylanthraquinone, 2-chloroanthraquinone, etc.; an acylphosphine oxide-type photoradical generator, etc.

Furthermore, as the hydrogen-drawing photoradical generator, there are mentioned a benzophenone/amine-type photoradical generator, a Michler ketone/benzophenone-type photoradical generator, a thioxanthone/amine-type photoradical generator, etc. Also usable here is a non-extracting photoradical generator for preventing migration of an unreacted photoradical generator. Specifically, for example, there are mentioned a polymerized derivative of an acetophenone-type radical generator, and a benzophenone derivative obtained by adding the double bond of an acrylic group to benzophenone.

One of these photoradical generators may be used singly or two or more thereof may be used in combination.

In the case where the radical generator (C) is incorporated in the sheet-forming body in the present invention, it is desirable that the content of the peroxide in the sheet-forming body, as measured through liquid chromatography mass spectrometry (LC-MS/MS), is 2% by mass or more. When the content is 2% by mass or more in the case where rubber layers are bonded via the sheet-forming body of the present invention in producing laminates and the like to be mentioned below, the thiol-ene reaction in the rubber layer surface can be efficiently attained and therefore sufficient adhesiveness between the rubber layer and the layer adjacent thereto can be secured within a short period of time. In addition, the radical generator (C) increases the reaction points for thiol-ene reaction, therefore expressing a stronger adhesion force. In some combinations of the polythiol compound (A) and the isocyanate group-containing compound (B), the sheet-forming body is hard and is difficult to handle, but even in such a case, when the content of the peroxide based on the radical generator (C) is 2% by mass or more, the sheet-forming body could be made soft and could be easy to handle.

Preferably, the content of the peroxide is 5% by mass or more and 50% by mass or less.

<Optional Component>

Any optional component may be blended in the sheet-forming body of the present invention. The optional component includes a urethanation catalyst, a surface conditioner, a solvent, a binder, a filler, a pigment dispersant, a conductivity-imparting agent, a UV absorbent, an antioxidant, a drying inhibitor, a penetrant, a pH regulator, a metal sequestering agent, an antibacterial antifungal agent, a surfactant, a plasticizer, a wax, a leveling agent, etc.

(Urethanation Catalyst (D))

As the urethanation catalyst (D), usable here is any urethanation catalyst. The urethanation catalyst includes organic tin compounds such as dibutyltin dilaurate, dibutyltin diacetate, dibutyltin thiocarboxylate, dibutyltin dimaleate, dioctyltin thiocarboxylate, tin octenoate, monobutyltin oxide, etc.; inorganic tin compounds such as stannous chloride, etc.; organic lead compounds such as lead octenoate, etc.; amines such as bis(2-diethylaminoethyl) ether, N,N,N',N'-tetramethylhexamethylenediamine, triethylenediamine (TEDA), benzyldimethylamine, 2,2'-dimorpholinoethyl ether, N-methylmorpholine, etc.; organic sulfonic acids such as p-toluenesulfonic acid, methanesulfonic acid, fluorosulfuric acid, etc.; inorganic acids such as sulfuric acid, phosphoric acid, perchloric acid, etc.; bases such as sodium alcoholate, lithium hydroxide, aluminum alcoholate, sodium hydroxide, etc.; titanium compounds such as tetrabutyl titanate, tetraethyl titanate, tetraisopropyl titanate, etc.; bismuth compounds; quaternary ammonium salts, etc. Of those, preferred are amines, and more preferred is triethylenediamine (TEDA). One of such catalysts may be used singly or two or more thereof may be used in combination.

(Surface Conditioner (E))

As the surface conditioner (E), usable here is any surface conditioner. The surface conditioner includes acrylic, vinylic, silicone-based, or fluorine-containing surface conditioner, and the like. Of those, preferred are silicone-based surface conditioners from the viewpoint of the compatibility and the surface tension-lowering capability thereof.

(Solvent)

The solvent is not specifically limited and may be any one not reacting with the other compounding ingredients, and examples thereof include an aromatic solvent and an aliphatic solvent.

Specific examples of the aromatic solvent include toluene, xylene, etc. The aliphatic solvent includes hexane, etc.

<Amount of Each Component>

The ratio of the total molar number of the isocyanate group contained in the isocyanate-containing compound (B) blended to the total molar number of the thiol group contained in the polythiol compound (A) blended (isocyanate group/thiol group) is preferably from 0.20 or more and 0.78 or less. When the ratio (isocyanate group/thiol group) falls within the range, the composition can be fully and firmly cured and the adhesion strength thereof is high. In addition, the amount of the thiol group is sufficient relative to the amount of the isocyanate group, and therefore thiol-ene reaction can be sufficiently carried out between the thiol group and the carbon-carbon double bond of a rubber member so that the composition can be firmly adhered to the rubber member and the adhesion strength thereof can be high. The ratio (isocyanate group/thiol group) is more preferably 0.3 or more and 0.7 or less, and is even more preferably from 0.4 or more and 0.65 or less.

Here, the total molar number of the thiol group contained in the polythiol compound (A) to be blended can be calculated by multiplying the molar number of the polythiol compound (A) to be blended by the number of the thiol groups that one molecule of the polythiol compound (A) has.

The total molar number of the isocyanate group contained in the isocyanate group-containing compound (B) to be blended can be measured according to the Method B in JIS K1603-1.

Further, the molar number ratio (isocyanate group/thiol group) may be calculated by dividing the total molar number of the isocyanate group contained in the isocyanate group-containing compound (B) to be blended, as measured in the manner as above, by the total molar number of the thiol group contained in the polythiol compound (A) to be blended.

In the case where the radical generator (C) is incorporated, the ratio of the total molar number of the radical generator (C) to be blended to the total molar number of the thiol group contained in the polythiol compound (A) to be blended (radical generator (C)/thiol group) is preferably 0.025 or more. With this, the adhesiveness could be improved. From this viewpoint, the ratio (radical generator (C)/thiol group) is preferably 0.03 or more, more preferably 0.035 or more, and even more preferably 0.04 or more. From the viewpoint of improving the adhesiveness, the ratio (radical generator (C)/thiol group) is preferably 1.0 or less, more preferably 0.8 or less, even more preferably 0.7 or less.

As an optional component, a compound containing a carbon-carbon double bond may be blended in the composition. However, when the amount of the carbon-carbon double bond-containing compound blended is too large, then the polythiol compound (A) may react with the carbon-carbon double bond-containing compound. As a result, the thiol-ene reaction between the polythiol compound (A) and the carbon-carbon double bond in rubber would hardly occur, and therefore the adhesion force of the composition to rubber may lower. As the case may be, owing to the hydrogen drawing reaction from the carbon-carbon bond main chain of rubber by this, the reaction between the sulfur atom of the thiol group of the polythiol compound (A) and the carbon atom of the carbon-carbon bond to chemically bind to each other could hardly occur so that the adhesion force of the composition to rubber may lower. Consequently, the ratio of the total molar number of the carbon-carbon double bond contained in the carbon-carbon double bond-containing compound to be blended, to the total molar number of the thiol group contained in the polythiol compound (A) to be blended (carbon-carbon double bond/thiol group) is preferably less than 0.4, more preferably less than 0.1, even more preferably 0.08 or less, still more preferably 0.05 or less, and most preferably 0.01 or less.

Here, the total molar number of the carbon-carbon double bond contained in the carbon-carbon double bond-containing compound to be blended may be calculated by multiplying the molar number of the compound to be blended by the number of the carbon-carbon double bonds that one molecule of the compound has.

The molar number ratio (carbon-carbon double bond/thiol group) may be calculated by dividing the total molar number of the carbon-carbon double bond-containing compound to be blended, as measured in the manner as above, by the total molar number of the thiol group contained in the polythiol compound (A) to be blended.

As described above, the sheet-forming body of the present invention may contain any optional component in addition to the indispensable compounds (A) and (B). However, from the viewpoint of strongly adhering to rubber, especially to vulcanized rubber, the total content of the components (A) to (C) in the composition is preferably 80% by mass or more, more preferably 90% by mass or more, even more preferably 95% by mass or more, still more preferably 98% by mass or more.

From the same viewpoint, the total content of the components (A) to (E) is preferably 90% by mass or more, more preferably 95% by mass or more, even more preferably 99% by mass or more, and further more preferably 100% by mass.

Using the sheet-forming body of the present invention makes it possible to strongly bond not only unvulcanized rubber but also vulcanized rubber. The reason may be presumed to be as follows.

It is considered that a part of the polythiol compound (A) and the isocyanate group-containing compound (B) could undergo urethanation and firmly cure to produce a sheet-forming body. In addition, it is also considered that another part of the polythiol compound (A) could react with the radical generator (C) to provide thiyl radicals, and the thiyl radical could react with the carbon-carbon double bond existing in rubber. It is considered that, through such a thiol-ene reaction, the sheet-forming body could chemically bond to rubber to thereby strongly adhere thereto. In particular, since carbon-carbon double bonds exist not only in unvulcanized rubber but also in vulcanized rubber, it is considered that using the sheet-forming body of the present invention could realize strong bonding of rubber, especially vulcanized rubber. Preferably the radical generator (C) exist in the sheet-forming body, but the substance may be in a state capable of reacting with the polythiol compound in the sheet-forming body in a bonding process, and therefore, the radical generator may also be made to exit in the surface of the rubber layer to be bonded.

In addition, it is considered that the sulfur atom of the thiol group in the polythiol compound (A) may chemically bond to the carbon atom in the carbon-carbon bond through the hydrogen-drawing reaction from the carbon-carbon bond main chain existing in rubber. Accordingly, a carbon-carbon double bond is not always needed to exist in rubber.

[Adhesive Sheet]

The adhesive sheet of the present invention is provided with the above-mentioned sheet-forming body of the present invention.

The adhesive sheet can be favorably obtained by applying a composition for forming the sheet-forming body onto a release sheet such as a release paper, a release film or the like and keeping the sheet form. It is considered that, during the keeping operation, at least a part of the thiol group and the isocyanate group in the composition could react through thiol-urethanation reaction to give a sheet-forming body on the release sheet.

In applying the composition, the thickness of the composition layer may be suitably selected in accordance with the subject to be adhered and with the necessary adhesion strength, etc. For example, the thickness may be from 1 μm to 1,000 μm, preferably from 20 μm to 300 μm, more preferably from 30 μm to 200 μm.

After the coating application, this is left at room temperature and, as a result, an adhesive sheet could be favorably produced. Also, after the coating operation, this may be heated in such a manner that the radical reaction would not be started by the radical generator (C), thereby giving an adhesive sheet. From the above-mentioned viewpoints, the ambient temperature or the heating temperature after the coating operation is preferably from −30 to 60° C., more preferably from −20 to 40° C., even more preferably from 0 to 40° C.

The standing time may be controlled by the amount of the urethanation catalyst. From the viewpoint of securing good operability in sheet formation and securing good maintenance of the sheet form during adhesion operation, the time is preferably 30 minutes or more, more preferably 60 minutes or more.

The material of the release sheet is not specifically limited, for which, however, favorably usable here are transparent resin substrates containing, as the main ingredient thereof, an organic resin, for example, a polyester resin such as polyethylene terephthalate, polycyclohexylene terephthalate, polyethylene naphthalate or the like, a polyamide resin such as nylon 46, modified nylon 6T, nylon MXD6, polyphthalamide or the like, a ketone resin such as polyphenylene sulfide, polythioether sulfone or the like, a sulfone resin such as polysulfone, polyether sulfone or the like, as well as polyether nitrile, polyarylate, polyether imide, polyamideimide, polycarbonate, polymethyl methacrylate, triacetyl cellulose, polystyrene, polyvinyl chloride or the like.

The thickness of the sheet-forming body to be formed on the release sheet may be suitably selected depending on the subject to which the sheet is to be adhered and the adhesion strength of the sheet, etc. For example, the thickness is from 1 μm to 1,000 μm, preferably from 20 μm to 300 μm, more preferably from 30 μm to 200 μm.

[Laminate]

The laminate of the present invention is a laminate including two or more layers bonded to each other, wherein at least one layer is a rubber layer, and the rubber layer is adhered to the adjacent layer via the above-mentioned sheet-forming body.

The plural layers may be all rubber layers, or may contain any other layer than a rubber layer.

The dimension of each layer and the number of the layers may be suitably selected depending on the intended object.

<Rubber Layer>

The rubber layer may be a vulcanized rubber or an unvulcanized rubber.

Preferably, the rubber that constitutes the rubber layer has a carbon-carbon double bond. In this case, it is presumed that the carbon atom of the carbon-carbon double bond that the rubber layer adjacent to the sheet-forming body or the adhesive sheet has may form a carbon-sulfur bond along with the sulfur atom of the thiol group of the polythiol compound (A) that the sheet-forming body or the adhesive sheet has.

However, it is presumed that, even though the rubber to constitute the rubber layer does not have a carbon-carbon double bond, a laminate could be obtained. In this case, it is presumed that, owing to the hydrogen-drawing reaction from the carbon-carbon bond main chain existing in rubber by the polythiol compound (A), the sulfur atom of the thiol group in the polythiol compound (A) could chemically bind to the carbon atom of the carbon-carbon bond. However, from the viewpoint of improving the adhesion force of the laminate, it is desirable that the rubber to constitute the rubber layer has a carbon-carbon double bond.

The material of the rubber layer is not specifically limited. For example, preferred are natural rubber; conjugated dienic synthetic rubber such as polyisoprene synthetic rubber (IR), polybutadiene rubber (BR), styrene-butadiene copolymer rubber (SBR), acrylonitrile-butadiene rubber (NBR), chloroprene rubber (CR), butyl rubber (IIR), etc.; as well as ethylene-propylene copolymer rubber (EPM), ethylene-propylene-diene copolymer rubber (EPDM), polysiloxane rubber, etc. Of those, preferred are natural rubber and conjugated dienic synthetic rubber. Two or more rubber components may be combined for use herein.

<Other Layer than Rubber Layer>

As the other layer than the rubber layer, there are mentioned a metal layer and a resin layer. Using the sheet-forming body and the adhesive sheet of the present invention, these metal layer and resin layer can be firmly bond.

<Production Method for Laminate>

Next, a production method for a laminate using the sheet-forming body or the adhesive sheet is described below.

The laminate of the present invention can be favorably obtained by adhering the adjacent layers with the sheet-forming body of the present invention. The laminate may be obtained using one sheet-forming body, or may be obtained using two or more sheet-forming bodies or adhesive sheets. The sheet-forming body is generally one prepared by peeling off the release sheet from the above-mentioned adhesive sheet.

For example, first, one sheet-forming body is put between adjacent layers to give a layered body. Next, if desired, while a pressing pressure is applied thereto in the thickness direction thereof, the layered body is cured to favorably produce a laminate.

In the case where a pressing pressure is applied to the layered body, the pressing pressure is, from the viewpoint of improving the adhesion force, preferably 0.1 to 5.0 MPa, more preferably 0.2 to 4.0 MPa, even more preferably 0.3 to 3.0 MPa, especially preferably 0.4 to 3.0 MPa.

In the case where the sheet-forming body contains a thermal radical generator as a radical generator, it is preferable to perform curing by heating. As the heating temperature, a temperature at which the thermal radical generator could efficiently generate radicals may be suitably selected, and the temperature is preferably around the one-minute half-life temperature of the thermal radical generator±30° C.

In the case where the sheet-forming body contains a photoradical generator as a radical generator, it is preferable to cure the body by photoirradiation. As the light, preferably used here is at least one selected from electromagnetic waves such as UV rays, visible rays, IR rays, X rays, etc.; and corpuscular beams such as α rays, γ rays, electron rays, etc. Of those, UV rays are preferred as the light. From the viewpoint of improving the adhesion force and from the viewpoint of cost reduction, a UV lamp is preferably used as the light source. Also from the same viewpoints, the photoirradiation time is preferably from a few seconds to several tens of seconds, more preferably from 1 to 40 seconds, even more preferably from 3 to 20 seconds.

In any operation of heating and photoirradiation, the site to be heated and the site to be subjected to photoirradiation are not specifically limited so far as heat energy or light energy could be transmitted to the sheet-forming body, that is, any site of the layered body could be heated or photoirradiated. Namely, the sheet-forming body may be directly heated or photoirradiated, or may be heated or photoirradiated via rubber and/or adherend.

The fact that a strong adhesion force can be realized even in the case where the body is cured by heating is advantageous in that the heating method can be employed even in the case where sufficient photoirradiation to the sheet-forming body is difficult, and is additionally favorable in point of easy operation since any site of the layered body can be heated and/or photoirradiated to realize strong adhesion.

EXAMPLES

The present invention is described in more detail with reference to Examples given below; however, the present invention is not whatsoever limited to the following Examples.

[Source Materials and Others]

As the source materials and others, the following were used.

<Polythiol Compound (A) (Component (A))>

Pentaerythritol tetrakis(3-mercaptopropionate) (PEMP): manufactured by SC Organic Chemical Co., Ltd., having 4 thiol groups.

Dipentaerythritol hexakis(3-mercaptopropionate) (DPMP): manufactured by SC Organic Chemical Co., Ltd., having 6 thiol groups.

<Isocyanate Group-Containing Compound (B) (Component (B))>

HDI burette-modified isocyanate: manufactured by Sumitomo Bayer Urethane Co., Ltd., trade name "Desmodur N3200", having NCO content of 23.0% by mass.

IPDI isocyanurate-modified isocyanate: manufactured by Sumitomo Bayer Urethane Co., Ltd., trade name "Desmodur Z4470BA", having NCO content of 11.9% by mass.

<Radical Generator (C) (Component (C))> t-Butyl 2-ethylperoxyhexanoate: manufactured by NOF Corporation, trade name "Perbutyl O".

<Urethanation Catalyst (D) (Component (D))>

Triethylenediamine (TEDA): manufactured by Air Products and Chemicals, Inc., trade name "DABCO 33LV catalyst".

<Surface Conditioner (E) (Component (E))>

Mixture of silicone-containing oligomer and tripropylene glycol diacrylate: manufactured by Miwon Specialty Chemical Co., Ltd., trade name "Miramer SIU2400".

[Measurement of Number of Thiol Groups]

The total molar number of the thiol group contained in the polythiol compound (A) to be blended is determined through calculation of dividing the blended amount of the compound by the theoretical molecular weight thereof, followed by multiplying the resultant value by the number of the thiol groups that one molecule of the polythiol compound (A) has.

[Measurement of Number of Isocyanate Groups]

The total molar number of the isocyanate group contained in the isocyanate group-containing compound (B) to be blended is determined according to the method B in JIS K1603-1.

[Peak Intensity Ratio in IR Absorption Spectrum]

The ratio of the peak intensity A of the absorption peak based on the carbonyl group in the thiourethane bond in the sheet-forming body to the peak intensity B of the absorption peak based on the thiol group therein (A/B) is determined as follows.

Using a Fourier transform infrared spectrophotometer (FT-IR, Nocolet 6700 manufactured by Thermo Fisher Scientific K.K.), an IR absorption spectrum of the sheet-forming body is determined. On the IR absorption spectrum, the peak intensity ratio A (1678 cm$^{-1}$) of the absorption peak based on the carbonyl group in the thiourethane bond to the peak intensity B (2570 cm$^{-1}$) of the absorption peak based on the thiol group are read, and the peak intensity ratio (A/B) is calculated from them.

The condition for the IR absorption spectrometry is as follows.

Resolution: 8 cm$^{-1}$
Integration frequency: 32 times
Measurement method: ATR method (Smart Orbit single bounce technique, diamond ATR)
Incidence angle: 45°

[Measurement of Peroxide Content]

(Test Sample)

2.5 mg of a film of the sheet-forming body is cut out, and immersed in 5 mL of acetonitrile for 24 hours, and the resultant extract is used as a test sample. In a preliminary test, it was confirmed that almost all the total volume of the peroxide in the film could be extracted out.

(Analysis)

The sample was analyzed through liquid chromatography mass spectrometry (LC-MS/1\4S) under the condition mentioned below.

Analyzer: Triple quadrupole mass spectrometer (TSQ Vantage, manufactured by Thermo Fisher Scientific K.K.)
High Performance Liquid Chromatograph
Column: Inert Sustain C18 (length 150 mm, inner diameter 2.1 mm, grain size 3 μm),
Column temperature: 40° C.
Mobile phase: 10 mM ammonium acetate-acetonitrile solution/10 mM ammonium acetate solution=90/10
Flow rate: 0.2 mL/min,
Sample injection amount: 1 μL
MS/MS
Ionization method: ESI-Positive, m/z: 234>73

[Production of Rubber Member]

According to the compounding recipe shown in Table 1 below, rubber members (100 mm in length×25 mm in width×10 mm in thickness) were produced. Concretely, unvulcanized rubber (NR/SBR) that had been prepared by kneading the components as in Table 1 was rolled into a sheet having a size of 50 mm in length×270 mm in width× 3.4 mm in thickness, and then three of these sheets were layered, and vulcanized in a mold having a size of 150 mm in length×270 mm in width×10 mm in thickness at 150° C. for 45 minutes. The resultant vulcanized rubber was cut into pieces each having a length of 100 mm and a width of 25 mm to be samples (rubber members) for tensile test.

TABLE 1

|  |  | Type of Rubber NR/SBR |
|---|---|---|
| Compounding Formulation | NR | 50 |
|  | SBR | 50 |
|  | Carbon Black | 50 |
| | Stearic Acid | 2 |
| | Antiaging Agent | 1 |
| | Zinc Oxide | 3 |
| | Vulcanization Accelerator 1 | 0.4 |
| | Vulcanization Accelerator 2 | 0.2 |
| | Sulfur | 1.4 |

* The numerical value in Table is part by mass.

The details of the components in Table 1 are as follows:
Natural rubber (NR): RSS#3.
Styrene-butadiene copolymer rubber (SBR): manufactured by JSR Corporation, trade name "JSR 1500".
Carbon black: manufactured by Asahi Carbon Co., Ltd., trade name "Asahi #70".
Antiaging agent: N-phenyl-N'-(1,3-dimethylbutyl)-p-phenylenediamine, manufactured by Ouchi Shinko Chemical Industrial Co., Ltd., trade name "Nocrac 6C".
Vulcanization accelerator 1: 1,3-diphenylguanidine, manufactured by Ouchi Shinko Chemical Industrial Co., Ltd., trade name "Nocceler D (D-P)".
Vulcanization accelerator 2: di-2-benzothiazolyl disulfide, manufactured by Ouchi Shinko Chemical Industrial Co., Ltd., trade name "Nocceler DM-P (DM)".

(Steel Plate)

As a steel plate, used here was SPCC-SD manufactured by Test Piece Co., Ltd.

[Handleability and Workability of Sheet-Forming Body]

The formed sheet-forming body was evaluated in point of the handleability and workability thereof according to the following evaluation criteria.

A: After formation of the sheet-forming body, it is easy to handle as a single film, and brings about no cracking in a process of sticking the body to an adherend and in a pressing process.

B: After formation of the sheet-forming body, it is somewhat difficult to handle as a single film, but can be used. In peeling the body from a release sheet to be a film, or in a process of sticking the body to an adherend or in a pressing process, some cracking occurs.

C: Though the sheet-forming body was formed, the cohesion force of the film was small and the surface thereof was seriously sticky, and therefore the body could not peeled off from the release sheet, or the film was too stiff and was cracked in handling it.

[Method for Measurement of Adhesion Force]

The sheet-forming body having a thickness of 30 μm was sandwiched between the above-mentioned rubber members (or between the above-mentioned rubber member and a steel plate), and cured. For curing it, the sheet was kept as such while pressed under a pressure of 2.5 MPa at a temperature of 150° C. for 30 minutes. The rubber members were peeled in the direction of 180 degrees at a pulling rate of 50 mm/min to determine the peeling strength (N/25 mm) as an index of the adhesion thereof.

Regarding the value of the adhesion force, the force of 100 N/25 mm or more means a sufficient adhesion force on a level of breakage of the rubber substrate. The adhesion force is preferably 300 N/25 mm or more. On the other hand, the adhesion force less than 100 N/25 mm means that the reaction between the substrate and the sheet-forming body is insufficient so that the two are in a state of peeling at the interface therebetween, or means that the cohesion force of the sheet-forming body is insufficient so that the sheet-forming body itself is under cohesion failure. In those states, it could not be said that the adhesion force would be sufficient.

Examples 1 to 19 and Comparative Examples 1 and 2

The components were formulated as shown in Table 2 below (in which the numerical value of each component means part by mass) to give a composition, and the composition was applied onto a PET-made release sheet and kept at room temperature for 12 hours thereby giving an adhesive sheet with a sheet-forming body formed on the release sheet. Next, the sheet-forming body was peeled off from the adhesive sheet to give a sheet-forming body having a length of 100 mm, a width of 25 mm and a thickness of 30 μm.

According to the above-mentioned method, the resultant sheet-forming body was tested for the adhesion force thereof. The evaluation results of the handleability and workability and the adhesiveness of the sheet are shown in Table 3.

TABLE 2

| | Component (A) | | Component (B) | | Component (C) Perbutyl O (part by mass) | Component (D) TEDA (part by mass) | Component (E) SIU2400 (part by mass) | Isocyanate Group/Thiol Group (molar ratio) | Component (C)/Thiol Group (molar ratio) | LC-MS/MS Peroxide Content (% by mass) | FTIR Peak Intensity Ratio (A/B) |
|---|---|---|---|---|---|---|---|---|---|---|---|
| | Type | Amount Blended (part by mass) | Type | Amount Blended (part by mass) | | | | | | | |
| Example 1 | PEMP | 58.1 | N3200 | 30.2 | 10.5 | 0.0006 | 1.2 | 0.35 | 0.10 | 8.46 | 37.6 |
| Example 2 | PEMP | 51.3 | N3200 | 38.5 | 9.2 | 0.0005 | 1.0 | 0.5 | 0.10 | 8.02 | 53.3 |
| Example 3 | PEMP | 46.1 | N3200 | 44.7 | 8.3 | 0.0005 | 0.9 | 0.65 | 0.10 | 7.12 | 83.4 |
| Example 4 | PEMP | 42.2 | N3200 | 49.4 | 7.6 | 0.0004 | 0.8 | 0.78 | 0.10 | 6.64 | 211 |
| Example 5 | PEMP | 51.3 | Z4470BA | 29.7 | 17.9 | 0.0103 | 1.0 | 0.2 | 0.20 | 15.35 | 36.8 |
| Example 6 | PEMP | 42.0 | Z4470BA | 42.4 | 14.7 | 0.0084 | 0.8 | 0.35 | 0.20 | 14.70 | 52.2 |
| Example 7 | PEMP | 35.6 | Z4470BA | 51.2 | 12.5 | 0.0071 | 0.7 | 0.5 | 0.20 | 12.48 | 78.0 |
| Example 8 | PEMP | 30.8 | Z4470BA | 57.8 | 10.8 | 0.0062 | 0.6 | 0.65 | 0.20 | 10.87 | 101 |
| Example 9 | PEMP | 27.7 | Z4470BA | 52.1 | 19.6 | 0.0083 | 0.6 | 0.65 | 0.40 | 18.62 | 99 |
| Example 10 | PEMP | 25.3 | Z4470BA | 47.4 | 26.8 | 0.0076 | 0.5 | 0.65 | 0.60 | 26.15 | 103 |
| Example 11 | PEMP | 27.6 | Z4470BA | 62.2 | 9.7 | 0.0055 | 0.6 | 0.78 | 0.20 | 9.49 | 118 |
| Example 12 | DPMP | 57.8 | Z4470BA | 31.2 | 9.8 | 0.0116 | 1.2 | 0.2 | 0.10 | 8.88 | 23.6 |
| Example 13 | DPMP | 46.7 | Z4470BA | 44.4 | 7.9 | 0.0093 | 0.9 | 0.35 | 0.10 | 7.46 | 48.2 |
| Example 14 | DPMP | 39.4 | Z4470BA | 53.1 | 6.7 | 0.0079 | 0.8 | 0.5 | 0.10 | 7.14 | 89.6 |
| Example 15 | DPMP | 33.9 | Z4470BA | 59.7 | 5.8 | 0.0068 | 0.7 | 0.65 | 0.10 | 6.15 | 148 |
| Example 16 | DPMP | 30.3 | Z4470BA | 63.9 | 5.2 | 0.0061 | 0.6 | 0.78 | 0.10 | 5.51 | 220 |
| Example 17 | PEMP | 55.2 | N3200 | 41.4 | 2.3 | 0.0006 | 1.1 | 0.5 | 0.024 | 1.95 | 52.1 |
| Example 18 | DPMP | 35.0 | Z4470BA | 61.7 | 2.6 | 0.0105 | 0.7 | 0.65 | 0.044 | 2.50 | 140 |
| Example 19 | DPMP | 35.0 | Z4470BA | 62.0 | 2.0 | 0.0106 | 0.7 | 0.65 | 0.034 | 1.95 | 146 |
| Comparative Example 1 | PEMP | 63.0 | N3200 | 24.4 | 11.3 | 0.0006 | 1.3 | 0.26 | 0.10 | 9.61 | 19.5 |
| Comparative Example 2 | PEMP | 41.7 | N3200 | 50.0 | 7.5 | 0.0004 | 0.8 | 0.80 | 0.10 | 6.35 | 255 |

TABLE 3

| | FTIR Peak Intensity Ratio (A/B) | Handleability and Workability | Adhesion Force (N/25 mm) | Remarks |
|---|---|---|---|---|
| Example 1 | 37.6 | A | 220 | — |
| Example 2 | 53.3 | A | 929 | — |
| Example 3 | 83.4 | A | 785 | — |
| Example 4 | 211 | A | 210 | — |
| Example 5 | 36.8 | A | 120 | — |
| Example 6 | 52.2 | A | 320 | — |
| Example 7 | 78.0 | A | 516 | — |
| Example 8 | 101 | A | 623 | — |
| Example 9 | 99 | A | 650 | — |
| Example 10 | 103 | A | 637 | — |
| Example 11 | 118 | A | 235 | — |
| Example 12 | 23.6 | A | 155 | — |
| Example 13 | 48.2 | A | 223 | — |
| Example 14 | 89.6 | A | 435 | — |
| Example 15 | 148 | A | 521 | — |
| Example 16 | 220 | A | 195 | — |
| Example 17 | 52.1 | A | 115 | — |
| Example 18 | 140 | A | 221 | — |
| Example 19 | 146 | B | 189 | As brittle, this is somewhat difficult to handle, but has no problem in practical use. |
| Comparative Example 1 | 19.5 | C | — | This did not peel off from release sheet. |
| Comparative Example 2 | 255 | A | 63 | — |

Examples 20 and 21 and Comparative Example 3

The sheet-forming bodies obtained in Examples 7 and 14 and Comparative Example 2 were tested for the adhesion force thereof in the same manner as in Example 1 except that the subjects to be adhered were changed to the above-mentioned rubber member and steel plate. The results are shown in Table 4.

TABLE 4

|  | Sheet-Forming Body | FTIR Peak Intensity Ratio (A/B) | Adhesion Force (N/25 mm) |
| --- | --- | --- | --- |
| Example 20 | Example 7 | 78.0 | 180 |
| Example 21 | Example 14 | 89.6 | 160 |
| Comparative Example 3 | Comparative Example 2 | 255 | 20 |

[Evaluation]

As shown in Table 2 to Table 4, with respect to the sheet-forming bodies of Examples 1 to 19, the peak intensity ratio in the IR absorption spectrum thereof is 20 or more and 250 or less, and therefore the sheets exhibit good handleability and workability, and the adhesion force thereof is high not only between rubber members but also between a rubber member and a steel plate.

On the other hand, in Comparative Examples 1 to 3, the peak intensity ratio is outside the scope of the present invention, and desired results could not be realized in point of any of the handleability and workability and the adhesion force.

INDUSTRIAL APPLICABILITY

The sheet-forming body and the adhesive sheet of the present invention can be utilized for adhesion to rubber, especially to vulcanized rubber.

The invention claimed is:

1. A laminate comprising two or more layers bonded to each other, wherein:
   at least one layer is a rubber layer, and
   the at least one rubber layer is adhered to the adjacent layer via a sheet-forming body comprising a thiourethane bond-having compound and a thiol group-having compound, wherein:
   in an IR absorption spectrum thereof, the ratio of the peak intensity A of the absorption peak based on the carbonyl group in the thiourethane bond to the peak intensity B of the absorption peak based on the thiol group (A/B) is 20 or more and 250 or less.

2. The laminate according to claim 1, wherein at least a polythiol compound (A) and an isocyanate group-containing compound (B) are blended.

3. The laminate according to claim 2, wherein a radical generator (C) is further blended.

4. The laminate according to claim 3, wherein the radical generator (C) is a thermal radical generator containing a peroxide.

5. The laminate according to claim 3, wherein the content of the peroxide, as measured through liquid chromatography mass spectrometry, is 2% by mass or more.

6. The laminate according to claim 2, wherein the ratio of the total molar number of the isocyanate group contained in the isocyanate group-containing compound (B) to the total molar number of the thiol group contained in the polythiol compound (A) (isocyanate group/thiol group) is 0.2 or more and 0.78 or less.

7. The laminate according to claim 4, wherein the ratio of the total molar number of the radical generator (C) to the total molar number of the thiol group contained in the polythiol compound (A) (radical generator (C)/thiol group) is 0.025 or more.

8. An adhesive sheet provided with the laminate of claim 1.

* * * * *